United States Patent
Monnes et al.

(10) Patent No.: US 10,567,927 B2
(45) Date of Patent: *Feb. 18, 2020

(54) WIRELESS PTT COMMUNICATION SYSTEM WITH ENHANCED LOCATION REPORTING AND RELATED DEVICES AND METHODS

(71) Applicant: HARRIS CORPORATION, Melbourne, FL (US)

(72) Inventors: Peter Monnes, Chelmsford, MA (US); Shawn D. Lefebre, Salem, NH (US); Thomas A. Hengeveld, Hollis, NH (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,233

(22) Filed: Jun. 27, 2017

(65) Prior Publication Data

US 2018/0234813 A1 Aug. 16, 2018

Related U.S. Application Data

(63) Continuation of application No. 15/429,305, filed on Feb. 10, 2017.

(51) Int. Cl.
*H04W 4/10* (2009.01)
*H04W 4/021* (2018.01)
(Continued)

(52) U.S. Cl.
CPC ............... *H04W 4/10* (2013.01); *H04W 4/02* (2013.01); *H04W 4/021* (2013.01); *H04W 4/025* (2013.01); *H04W 4/06* (2013.01)

(58) Field of Classification Search
CPC ....... H04W 4/10; H04W 4/021; H04W 4/025; H04W 4/06; H04W 4/02
See application file for complete search history.

(56) References Cited

U.S. PATENT DOCUMENTS 8,175,069 B2 5/2012 Wang et al.
8,861,419 B2 10/2014 Korus et al.
(Continued)

FOREIGN PATENT DOCUMENTS

CN 101656912 2/2010
WO 2015014317 2/2015

OTHER PUBLICATIONS

Sheng Et Al., "Analysis of novel user detection scheme based on polling for E-MBMS networks", IEEE, 2008, pp. 1-5 See Priority U.S. Appl. No. 15/429,305, filed Feb. 10, 2017.
(Continued)

*Primary Examiner* — Jackie Zuniga Abad
(74) *Attorney, Agent, or Firm* — Allen, Dyer, Doppelt + Gilchrist, P.A.

(57) ABSTRACT

A wireless PTT communication system may include mobile wireless PTT communications devices, each configured to send a PTT call request, a wireless network coupling the mobile wireless PTT communications devices, and a PTT server. The PTT server may be configured to when a number of the mobile wireless PTT communications devices in a given talkgroup is greater than or equal to a first threshold, then cause each mobile wireless PTT communications device of the given talkgroup to report a respective location. The PTT server may be configured to when a number of the mobile wireless PTT communications devices in the given talkgroup is less than the first threshold, then disable each mobile wireless PTT communications device of the given talkgroup from reporting the respective location.

23 Claims, 4 Drawing Sheets

(51) Int. Cl.
*H04W 4/02* (2018.01)
*H04W 4/06* (2009.01)

(56) References Cited

U.S. PATENT DOCUMENTS

| | | | |
|---|---|---|---|
| 9,161,179 | B2 | 10/2015 | Anchan |
| 2008/0267109 | A1* | 10/2008 | Wang ................. H04W 72/005 370/312 |
| 2009/0264064 | A1 | 10/2009 | Hyun et al. |
| 2012/0170502 | A1 | 7/2012 | Korus et al. |
| 2012/0172028 | A1 | 7/2012 | Korus et al. |
| 2014/0192697 | A1* | 7/2014 | Anchan ............... H04W 72/005 370/312 |
| 2016/0227383 | A1* | 8/2016 | Lin ........................ H04W 4/08 |

OTHER PUBLICATIONS

Nokia Networks White Paper, "LTE networks for public safety services", 2014, pp. 1-24 See Priority U.S. Appl. No. 15/429,305, filed Feb. 10, 2017.

"BeOn Mobile Application, Public Safety's Most Advanced P25 Push-to-Talk Application," Harris Corporation, Jan. 4, 2016, pp. 1-8 See Priority U.S. Appl. No. 15/429,305, filed Feb. 10, 2017.

"BeOn Group Communications Services," User's Manual, Rev. K, Jun. 2016, pp. 1-145 See Priority U.S. Appl. No. 15/429,305, filed Feb. 10, 2017.

"Harris Puts P25 PTT on Smartphones, Tablets, and Other Devices," Jan. 6, 2017, pp. 1-11 See Priority U.S. Appl. No. 15/429,305, filed Feb. 10, 2017.

U.S. Appl. No. 15/226,266 (cited application is stored in the USPTO'S IFW system) See Priority U.S. Appl. No. 15/429,305, filed Feb. 10, 2017.

"3rd Generation Partnership Project; Technical Specification Group Services and System Aspects; Study on Architecture Enhancements to Support Group Communication System Enablers for LTE (GCSE LTE) (Release 12)", 3GPP Draft; 23768-C10, 3rd Generation Partnership Project (3GPP), Mobile Competence Centre ; 650, Route Des Lucioles ; F-06921 Sophia-Antipolis Cedex , France, (Aug. 18, 2014), P050835358, Retrieved from the Internet: URL: http://www.3gpp.org/ftp/tsg_sa/WG2_Arch/Latest_SA2_Specs/Rel-12/-— [retrieved on Aug. 18, 2014], pp. 1-63.

3rd Generation Partnership Project; Technical Specification Group Services and System Aspects; Mission Critical Services Common Requirements (MCCoRe); Stage 1 (Release 14), 3GPP Standard; 3GPP TS 22.280, 3rd Generation Partnership Project (3GPP), Mobile Competence Centre ; 650, Route Des Lucioles • F-06921 Sophia-Antipolis Cedex; France, vol. SA WG1, No. V14.2.0, Dec. 16, 2016 (Dec. 16, 2016), pp. 1-87, XP051229979, [retrieved on Dec. 16, 2016], pp. 1-87.

* cited by examiner

WIRELESS PTT COMMUNICATION SYSTEM WITH ENHANCED LOCATION REPORTING AND RELATED DEVICES AND METHODS

TECHNICAL FIELD

The present invention relates to the field of wireless communications, and, more particularly, to a wireless Push-to-Talk communication system and related methods

BACKGROUND

A typical wireless communications system comprises a plurality of wireless communications devices exchanging data with each other. In some wireless communications systems, for example, infrastructure networks, the system may further comprise a wireless base station for managing communications between the wireless communications devices. In other words, each intra-system communication would be exchanged via the wireless base station. In other wireless communications systems, for example, mesh networks and ad hoc wireless networks, the wireless base station may be omitted, i.e. the wireless communications devices may communicate directly with each other.

The wireless communications devices may communicate with each other based upon a wireless communications protocol. The 3rd Generation Partnership Project Long Term Evolution (3GPP LTE) wireless communications protocol is a robust technology aimed at providing metropolitan area networks, as disclosed in the 3GPP TS 22.011 V8.9.0 (2009-09) Technical Specification, which is hereby incorporated by reference in its entirety. In particular, the LTE wireless protocol is commonly referred to as the fourth generation cellular protocol.

The LTE wireless communications protocol may provide for: increased bandwidth, low latency, and increased signal penetration. Moreover, the LTE wireless communications protocol provides an entirely packet switched protocol for both voice and data, and a simplified infrastructure that is easily integrated into legacy systems. In public safety applications, a municipality may provide an LTE wireless network for use by personnel, such as law enforcement and maintenance workers.

In some public safety applications, the communication system may need to support Push-to-Talk (PTT) features. Typically, when a user wishes to initiate a PTT call request in the communication system, the respective device sends a unicast PTT call request to the intended recipient. In some applications, it may be desirable to allow the PTT call request to be sent to multiple users, i.e. a multicast PTT call request.

SUMMARY

Generally speaking, a wireless PTT communication system includes a plurality of mobile wireless PTT communications devices, each configured to send a PTT call request (i.e. a PTT multicast call request). The wireless PTT communication system also includes a wireless network coupling the plurality of mobile wireless PTT communications devices, and a PTT server. The PTT server is configured to when a number of the plurality of mobile wireless PTT communications devices in a given talkgroup is greater than or equal to a first threshold, then cause each mobile wireless PTT communications device of the given talkgroup to report a respective location. The PTT server is configured to when a number of the plurality of mobile wireless PTT communications devices in the given talkgroup is less than the first threshold, then disable each mobile wireless PTT communications device of the given talkgroup from reporting the respective location. Advantageously, the mobile wireless PTT communications devices may have improved battery life.

More specifically, the PTT server may be configured to when a number of mobile wireless PTT communications devices of the given talkgroup within a set geographic area is greater than or equal to a second threshold, then configure the wireless network to provide multicast bearer services for the given talkgroup within the set geographic area. The PTT server may be configured to when a call starts and the number of mobile wireless PTT communications devices of the given talkgroup within the set geographic area is greater than or equal to a third threshold, then configure the wireless network to map a portion of a multicast bearer to the mobile wireless PTT communications devices of the given talkgroup within the set geographic area for a broadcast mode.

In some embodiments, the PTT server may be configured to when the number of mobile wireless PTT communications devices of the given talkgroup within the set geographic area is less than a fourth threshold and when only the given talkgroup is using the multicast bearer services (i.e. if no other talkgroup is making use of the bearer or only the given talkgroup is using the bearer), then configure the wireless network to deallocate the multicast bearer services for the given talkgroup within the set geographic area. For example, the second threshold may be equal to the fourth threshold.

Additionally, the PTT server may be configured to configure the wireless network to provide multicast bearer services for the given talkgroup based upon at least one of a talkgroup state of the given talkgroup, a talkgroup priority of the given talkgroup, and a talkgroup type of the given talkgroup. The PTT server may be configured to configure the wireless network to provide multicast bearer services for the given talkgroup based upon macro user location information. The wireless network may include a Long-Term Evolution (LTE) wireless network, and the PTT call request may comprise a multicast PTT call request with a plurality of other mobile wireless PTT communications devices.

Another aspect is directed to a PTT server in a wireless PTT communication system comprising a plurality of mobile wireless PTT communications devices, each configured to send a PTT call request, and a wireless network coupling the plurality of mobile wireless PTT communications devices. The PTT server includes a processor and memory configured to when a number of the plurality of mobile wireless PTT communications devices in a given talkgroup is greater than or equal to a first threshold, then cause each mobile wireless PTT communications device of the given talkgroup to report a respective location. The processor is also configured to when a number of the plurality of mobile wireless PTT communications devices in the given talkgroup is less than the first threshold, then disable each mobile wireless PTT communications device of the given talkgroup from reporting the respective location.

Yet another aspect is directed to a method for operating a wireless PTT communication system comprising a plurality of mobile wireless PTT communications devices, each configured to send a PTT call request, a wireless network coupling the plurality of mobile wireless PTT communications devices, and a PTT server. The method includes when a number of the plurality of mobile wireless PTT communications devices in a given talkgroup is greater than or equal to a first threshold, then causing each mobile wireless PTT communications device of the given talkgroup to report a respective location. The method includes when a number of the plurality of mobile wireless PTT communications devices in the given talkgroup is less than the first threshold, then disabling each mobile wireless PTT communications device of the given talkgroup from reporting the respective location.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

Figure 1:
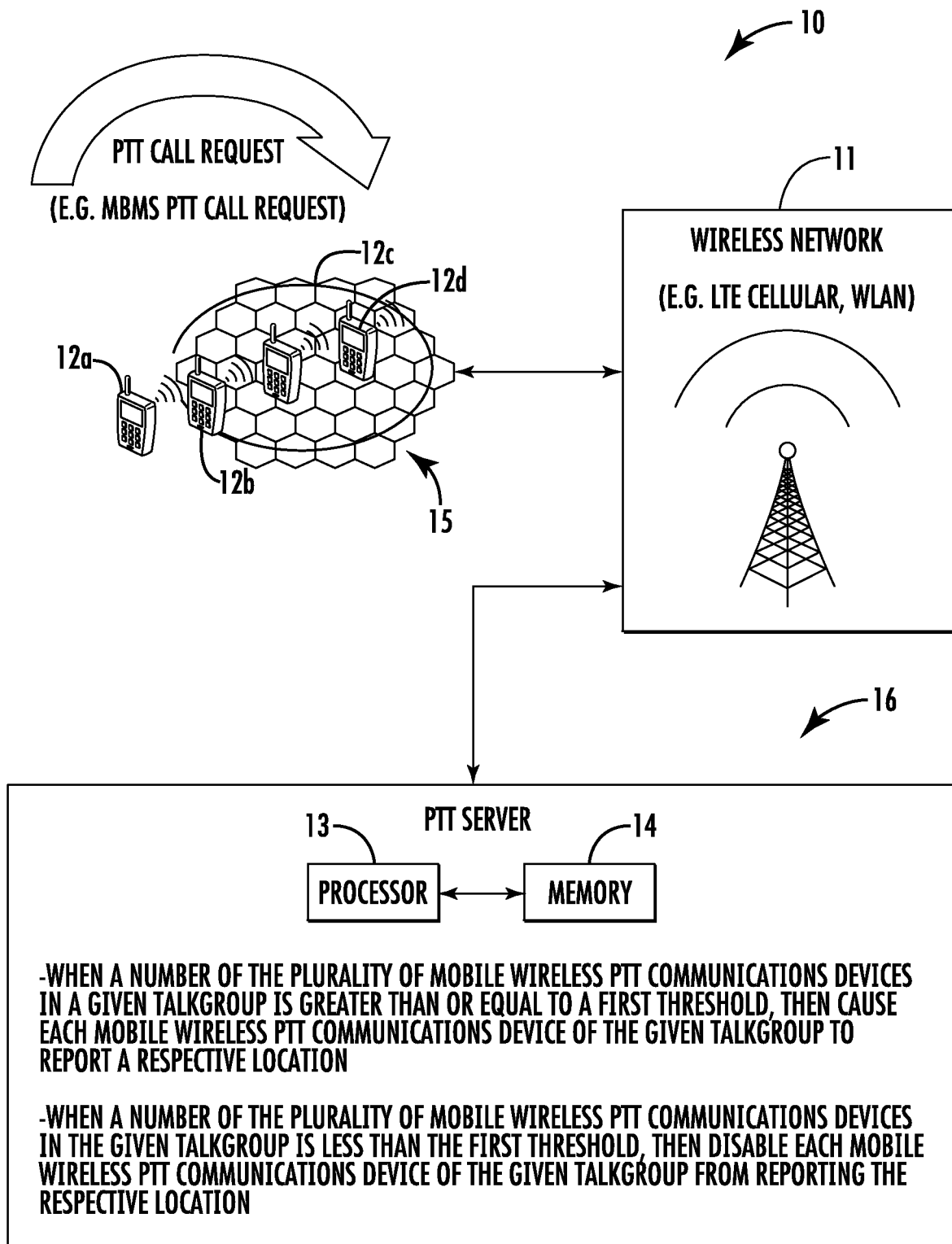
FIG. 1 is a schematic diagram of a wireless PTT communication system, according to the present disclosure.
Figure 2:
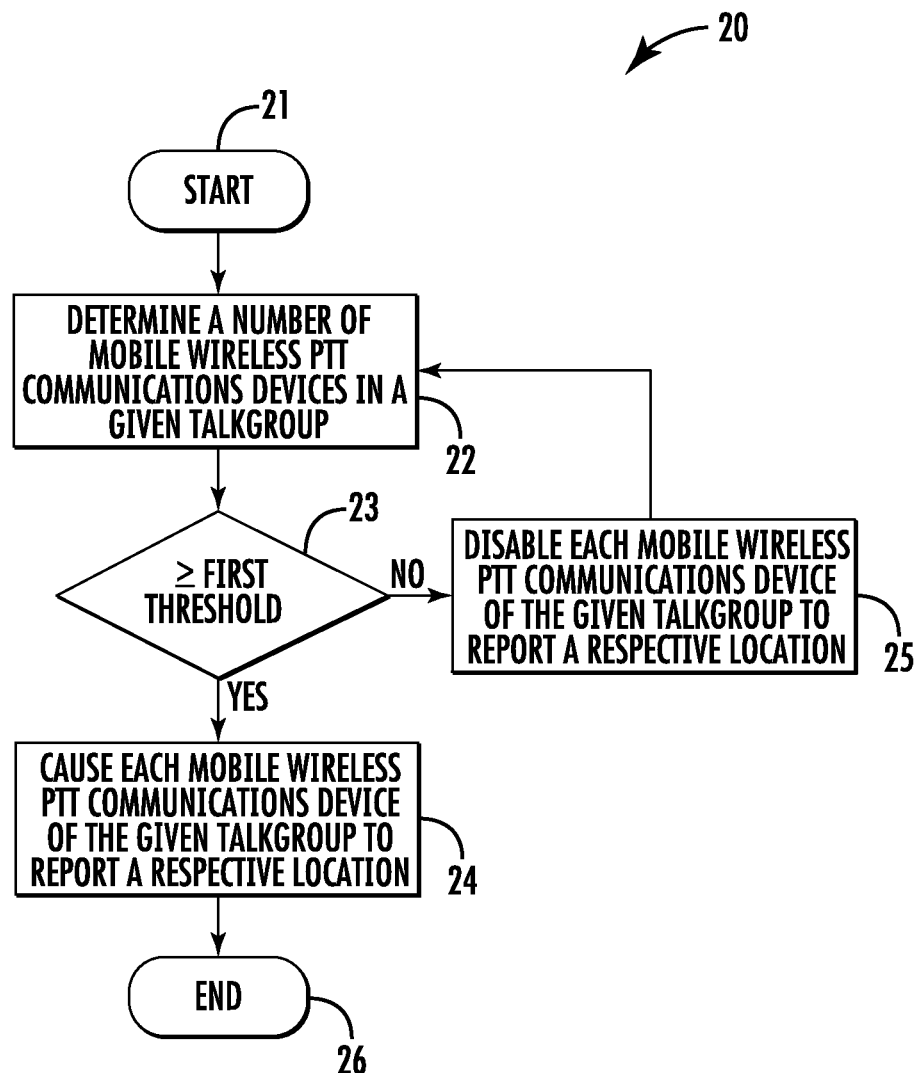
FIG. 2 is a flowchart illustrating operation of the wireless PTT communication system of FIG. 1.

Referring initially to FIGS. 1-2, a wireless PTT communication system 10 according to the present invention is now described. Also, a related method of operation in flowchart 20 is now described. The wireless PTT communication system 10 illustratively includes a plurality of mobile wireless PTT communications devices 12a-12d. For example, each of the plurality of mobile wireless PTT communications devices 12a-12d may comprise a cellular phone device, a tablet computing device, or a personal computing device.

Each of the plurality of mobile wireless PTT communications devices 12a-12d is configured to send a PTT call request. For example, the PTT call request may include a PTT call request with a plurality of other mobile wireless PTT communications devices 12a-12d. In certain circumstances, as discussed herein, the PTT call request may comprise a Multimedia Broadcast Multicast Services (MBMS) PTT call request.

The wireless PTT communication system 10 illustratively includes a wireless network 11 coupling the plurality of mobile wireless PTT communications devices 12a-12d. The wireless network 11 may include a Long-Term Evolution (LTE) wireless network, for example. In some embodiments, the wireless network 11 may comprise one or more of a cellular LTE network, and a wireless local area network (WLAN), such as IEEE 802.11x. It should be appreciated that the wireless network 11 may comprise a plurality of varying types of sub-networks interconnected via the Internet.

The wireless PTT communication system 10 illustratively includes a PTT server 16, which comprises a processor 13 and memory 14 cooperating therewith. For example, the PTT server 16 may comprise a fixed location computing device configured with software for PTT operations. In particular, for some embodiments, the software may comprise the BeOn® Secure Group Communications Application, as available from the Harris Corporation of Melbourne, Fla., the present application's assignee. The PTT server 16 is in communication with the wireless network 11 (e.g. via a wired coupling).

The PTT server 16 is configured to monitor and determine a number of the plurality of mobile wireless PTT communications devices 12a-12d and arrange the devices into one or more talkgroups. (Blocks 21-22). The PTT server 16 is also configured to determine whether the PTT call request should be a multicast PTT call request.

The PTT server 16 is configured to when a number of the plurality of mobile wireless PTT communications devices 12a-12d that are in or affiliated to a given talkgroup 15 is greater than or equal to a first threshold, then cause each mobile wireless PTT communications device of the given talkgroup to report a respective location. (Blocks 23-24, 26). The PTT server 16 is configured to when a number of the plurality of mobile wireless PTT communications devices 12a-12d that are in or affiliated to the given talkgroup 15 is less than the first threshold, then disable each mobile wireless PTT communications device of the given talkgroup from reporting the respective location except when a respective mobile wireless PTT communications device is reporting location for another reason. (Blocks 23, 25). For example, the PTT server 15 may poll on-board device geolocation devices for the respective location, such a global positioning system (GPS) antenna. In some embodiments, the PTT server 16 is configured to instruct the plurality of mobile wireless PTT communications devices 12a-12d to begin reporting location based upon trigger conditions, such as when it changes MBMS area or when it moves a certain distance or on a time interval, or a combination of triggers.

Another aspect is directed to a PTT server 16 in a wireless PTT communication system 10 comprising a plurality of mobile wireless PTT communications devices 12a-12d, each configured to send a PTT call request, and a wireless network 11 coupling the plurality of mobile wireless PTT communications devices. The PTT server 16 includes a processor 13 and memory 14 configured to when a number of the plurality of mobile wireless PTT communications devices 12a-12d in a given talkgroup 15 is greater than or equal to a first threshold, then cause each mobile wireless PTT communications device of the given talkgroup to report a respective location. The processor 13 is also configured to when a number of the plurality of mobile wireless PTT communications devices 12a-12d in the given talkgroup 15 is less than the first threshold, then disable each mobile wireless PTT communications device of the given talkgroup from reporting the respective location.

Yet another aspect is directed to a method for operating a wireless PTT communication system 10 comprising a plurality of mobile wireless PTT communications devices 12a-12d, each configured to send a PTT call request, a wireless network 11 coupling the plurality of mobile wireless PTT communications devices, and a PTT server 16. The method includes when a number of the plurality of mobile wireless PTT communications devices 12a-12d in a given talkgroup 15 is greater than or equal to a first threshold, then causing each mobile wireless PTT communications device of the given talkgroup to report a respective location. The method includes when a number of the plurality of mobile wireless PTT communications devices 12a-12d in the given talkgroup 15 is less than the first threshold, then disabling each mobile wireless PTT communications device of the given talkgroup from reporting the respective location.

In typical PTT systems, the PTT call request is a unicast communication. Hence, in order to perform a multicast PTT call request, multicast radio bearers may need to be setup. In fact, in typical multicast PTT systems, the typical PTT server creates and announces multicast radio bearers at system initialization. The multicast radio bearers have control channels that use air link resources. In typical approaches, each typical PTT device would report its location so that the typical PTT server knows when it is appropriate to issue multicast radio bearers. The constant reporting of location in typical approaches unnecessarily consumes air link resources and battery life of the typical PTT devices.

Also, the typical PTT server must also decide when to issue multicast radio bearers to respective talkgroups in the PTT system. If the talkgroup is too small, multicast resources are wasted, and if the talkgroup is too big, unicast resources are needlessly burdened. Moreover, the multicast radio bearers may be issued in all areas, even when not needed. The multicast radio bearers and their general purpose sub-channels continuously use bandwidth that could be used for other purposes. Advantageously, the mobile wireless PTT communications devices 12a-12d may have improved battery life, since they do not needlessly transmit location data when device density is low. Also, the wireless PTT communication system 10 may issue multicast radio bearers only when needed, thereby saving network resources.

Figure 3:
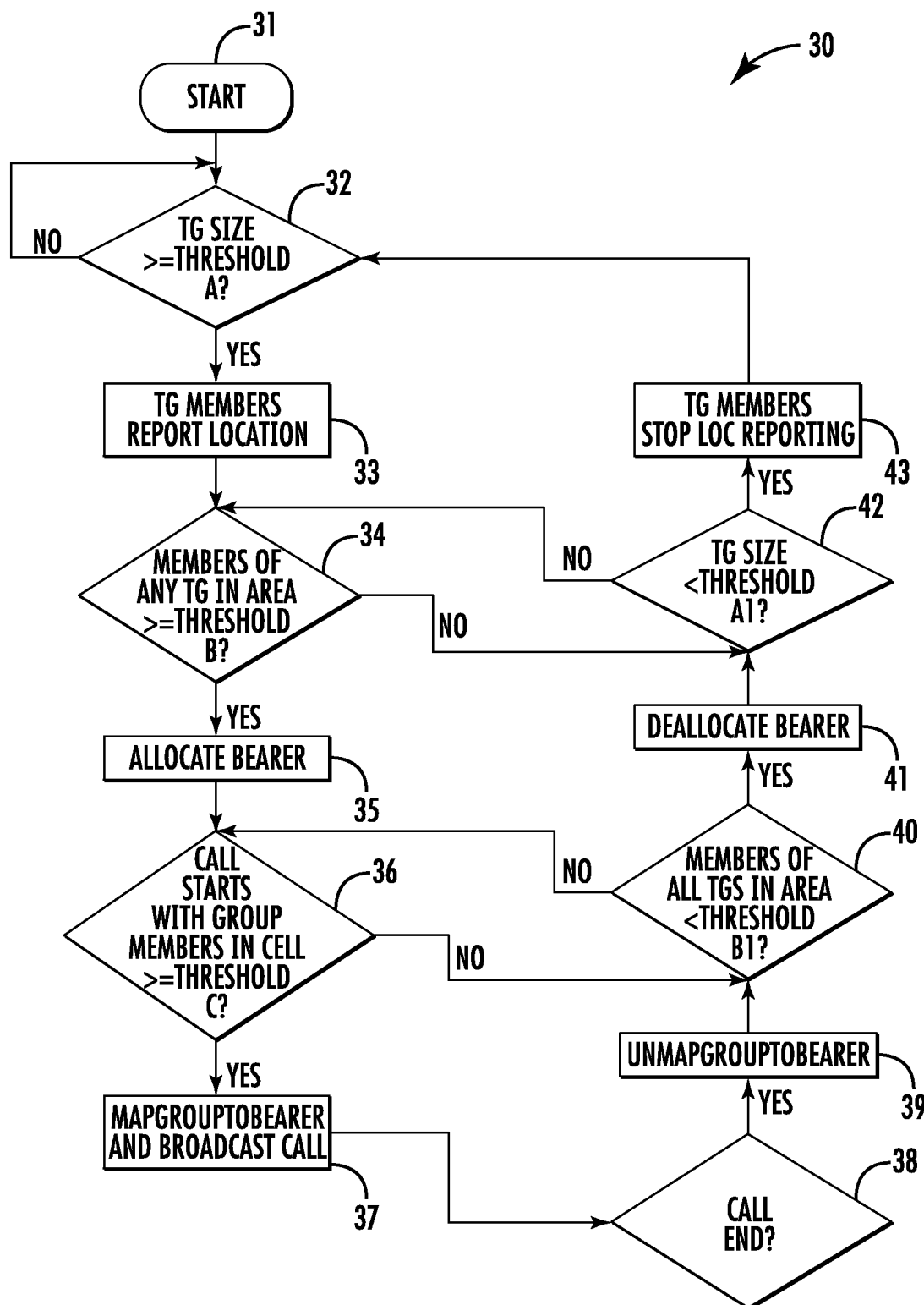
FIG. 3 is a flowchart illustrating operation of another exemplary embodiment of the wireless PTT communication system, according to the present disclosure.
Figure 4:
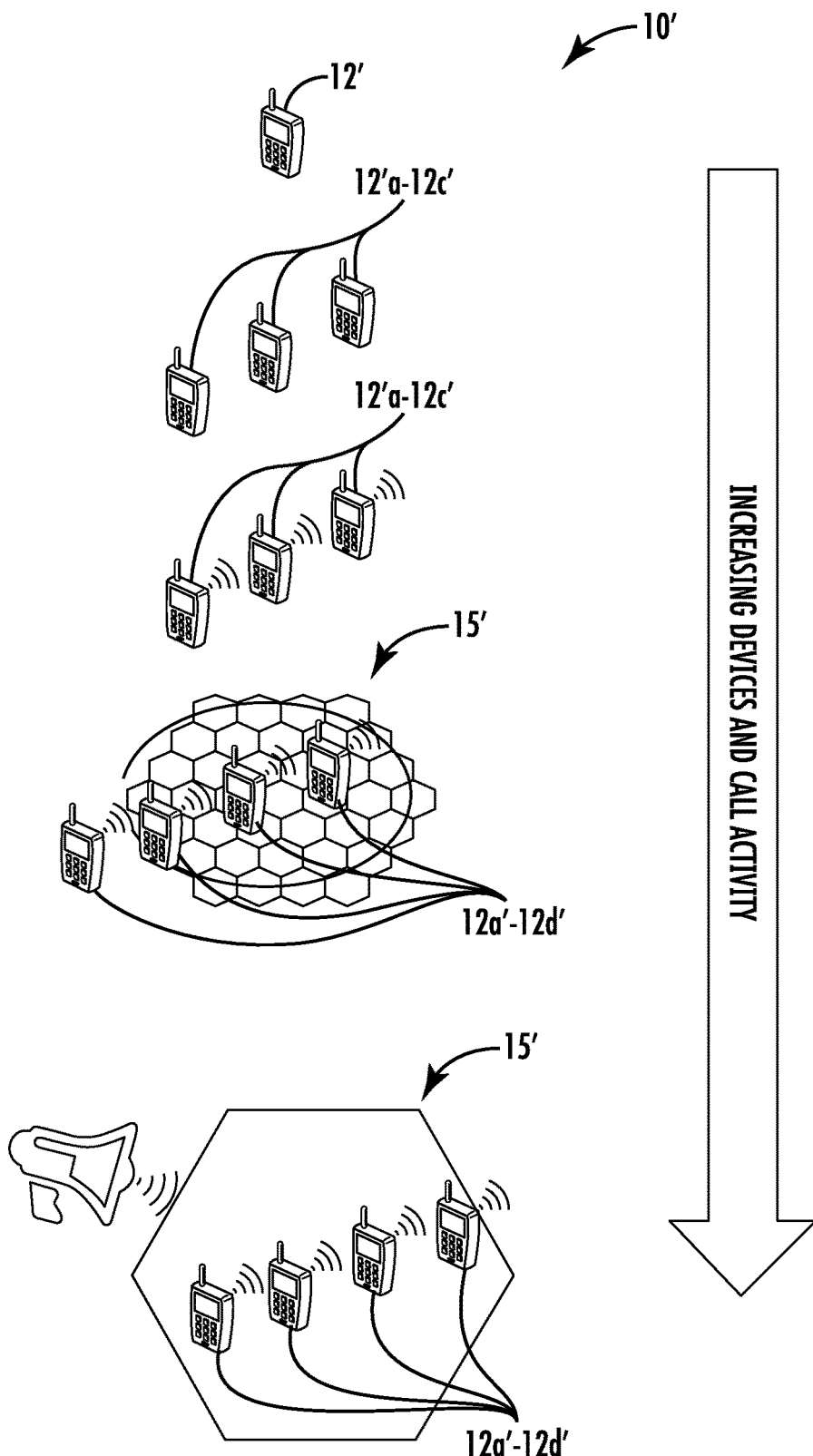
FIG. 4 is a diagram illustrating operation of yet another exemplary embodiment of the wireless PTT communication system, according to the present disclosure.

Referring now additionally to FIGS. 3-4 and a flowchart 30 therein, another embodiment of the method for operating the wireless PTT communication system 10 is now described. (Block 31). In this embodiment, the PTT server 16 is also configured to when a number of the plurality of mobile wireless PTT communications devices 12a-12d in the given talkgroup 15 is greater than or equal to the first threshold (A), then cause each mobile wireless PTT communications device of the given talkgroup to report a respective location. (Blocks 32-33).

The PTT server 16 is also configured to when a number of mobile wireless PTT communications devices 12a-12d of the given talkgroup 15 within a set geographic area is greater than or equal to a second threshold (B), then configure the wireless network 11 to provide multicast bearer services for the given talkgroup within the set geographic area. In other words, at least a portion of a multicast bearer is allocated. (Blocks 34-35). It should be appreciated that other talkgroups may use other portions of the same multicast bearer. For example, the set geographic area may comprise a transmission range of a base station. The PTT server 16 is also configured to when a number of mobile wireless PTT communications devices 12a-12d of the given talkgroup 15 within the set geographic area is less than the second threshold (B), then determine whether a number of mobile wireless PTT communications devices 12a-12d of the given talkgroup 15 is less than a fifth threshold (A1). (Block 42). If so, the PTT server 16 is configured to then disable each mobile wireless PTT communications device 12a-12d of the given talkgroup 15 from reporting the respective location, and otherwise, the method returns to Block 34. (Block 43).

Advantageously, the mobile wireless PTT communications devices 12a-12d only report location when it is needed. Moreover, the location data is leveraged to determine when the device density makes multicast radio bearers helpful. The PTT server 16 is also configured to when a call starts and the number of mobile wireless PTT communications devices 12a-12d of the given talkgroup 15 within the set geographic area is greater than or equal to a third threshold (C) (Block 36), then configure the wireless network 11 to map the portion of a multicast bearer to the mobile wireless PTT communications devices 12a-12d of the given talkgroup within the set geographic area for a broadcast mode. (Block 37). In another embodiment, the PTT server 16 is configured to take into consideration a number of users in a cell rather than in the geographic area.

In the illustrated embodiment, the PTT server 16 is configured to when the number of mobile wireless PTT communications devices 12a-12d of the given talkgroup 15 within the set geographic area is less than a fourth threshold (B1) and when no other talkgroup is making use of the multicast bearer services and when only the given talkgroup is using the multicast bearer services, then configure the wireless network 11 to deallocate the multicast bearer services for the given talkgroup within the set geographic area. (Blocks 40-41). In other words, the wireless network 11 maintains the allocation of the multicast bearer services for the given talkgroup 15 if other talkgroups are using it.

For example, in the illustrated embodiment, the second threshold is equal to the fourth threshold, but they may be different in other embodiments. In some embodiments, the first threshold is less than the second threshold, and the second threshold is less than the third threshold. The PTT server 16 is also configured to when the PTT call ends, then unmap the portion of the multicast bearer from the mobile wireless PTT communications devices 12a-12d of the given talkgroup 15 (i.e. ending the broadcast mode). (Blocks 38-39).

In some embodiments, the PTT server 16 is configured to configure the wireless network 11 to provide multicast bearer services for the given talkgroup 15 further based upon at least one of a talkgroup state (e.g. emergency state receiving advanced and greater resources) of the given talkgroup, a talkgroup priority of the given talkgroup, a talkgroup type of the given talkgroup, and priority and role of members of the given talkgroup. Also, the PTT server 16 may additionally be configured to configure the wireless network 11 to provide multicast bearer services for the given talkgroup 15 based upon macro user location information. In some embodiments, the macro user location information may be provided by using the location of a closest base station (i.e. the base station that the respective device is connected to).

In yet other embodiments, the PTT server 16 may additionally be configured to configure the wireless network 11 to provide multicast bearer services for the given talkgroup 15 based upon a total number of users in the set geographic area or cell, i.e. the devices in the given talkgroup and outside the given talkgroup. The PTT server 16 may additionally be configured to configure the wireless network 11 to provide multicast bearer services for the given talkgroup 15 based upon a size of the set geographic area. In particular, the PTT server 16 may resize the set geographic area, and create a buffer zone of N cells around a current device location.

In some embodiments, the PTT server 16 may additionally be configured to configure the wireless network 11 to provide multicast bearer services for the given talkgroup 15 based upon historical patterns of usage in the set geographic area, a number of devices in neighboring areas, a density of devices, and device mobility (i.e. if the user moves around at high speed, the PTT server may extrapolate when the user will leave the set geographic area and allocate resources in anticipation of the departure). In some embodiments, the PTT server 16 may additionally be configured to configure the wireless network 11 to provide multicast bearer services for the given talkgroup 15 based upon at least one of a total number of users in area, a number of cells in the area, a density of users (mix of first two items), a number of users in neighboring cells and in broadcast area, historical patterns of usage in the area, unicast congestion in the cell and/or neighboring cells, average length of call on the given talkgroup 15, congestion on multicast bearers, a size of talkgroup being de-prioritized from multicast bearer, and priorities of talkgroups already being multicast.

As perhaps best seen in FIG. 4, the wireless PTT communication system 10' adaptively reacts to the traffic in the system. Beginning from the top, when there are few mobile wireless PTT communications devices 12a'-12c', there is no need to report location nor form talkgroups. As the number of the mobile wireless PTT communications devices 12a'-12c' increases, the mobile wireless PTT communications devices 12a'-12c' start to report location. When there are enough mobile wireless PTT communications devices 12a'-12c' from the given talkgroup 15' in the set geographic area, the PTT server 16' sets up and announces a bearer, and the mobile wireless PTT communications devices 12a'-12c' each sends listening reports when they receive the bearer. At the bottom, when there are enough talkgroup 15' members in the set geographic area when a call starts, PTT calls will be broadcast.

Other features relating to wireless PTT communication system 10 are disclosed in co-pending application Ser. No. 15/226,266, which is incorporated herein by reference in its entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A wireless communication system comprising:
   a plurality of mobile wireless communications devices, each configured to send a request to broadcast;
   a wireless network coupling said plurality of mobile wireless communications devices; and
   a server configured to
      when a number of said plurality of mobile wireless communications devices in a given group is greater than or equal to a first threshold, then cause each mobile wireless communications device of the given group to report a respective location, and
      when a number of said plurality of mobile wireless communications devices in the given group is less than the first threshold, then disable each mobile wireless communications device of the given group from reporting the respective location until when said server commands restarting reporting of the respective location.

2. The wireless communication system of claim 1 wherein said server is configured to when a number of mobile wireless communications devices of the given group within a set geographic area is greater than or equal to a second threshold, then configure said wireless network to provide multicast bearer services for the given group within the set geographic area.

3. The wireless communication system of claim 2 wherein said server is configured to when a call starts and the number of mobile wireless communications devices of the given group within the set geographic area is greater than or equal to a third threshold, then configure the wireless network to map a portion of a multicast bearer to the mobile wireless communications devices of the given group within the set geographic area for a broadcast mode.

4. The wireless communication system of claim 2 wherein said server is configured to when the number of mobile wireless communications devices of the given group within the set geographic area is less than a fourth threshold and when only the given group is using the multicast bearer services, then configure said wireless network to deallocate the multicast bearer services for the given group within the set geographic area.

5. The wireless communication system of claim 4 wherein the second threshold is equal to the fourth threshold.

6. The wireless communication system of claim 1 wherein said server is configured to configure said wireless network to provide multicast bearer services for the given group based upon at least one of a group state of the given group, a group priority of the given group, and a group type of the given group.

7. The wireless communication system of claim 1 wherein said server is configured to configure said wireless network to provide multicast bearer services for the given group based upon macro user location information.

8. The wireless communication system of claim 1 wherein said wireless network comprises a Long-Term Evolution (LTE) wireless network; and wherein the request to broadcast comprises a multicast call request.

9. A server for a wireless communication system comprising a plurality of mobile wireless communications devices, each configured to send a request to broadcast, and a wireless network coupling the plurality of mobile wireless communications devices, the server comprising:
   a processor and an associated memory configured to
      when a number of the plurality of mobile wireless communications devices in a given group is greater than or equal to a first threshold, then cause each mobile wireless communications device of the given group to report a respective location, and
      when a number of the plurality of mobile wireless communications devices in the given group is less than the first threshold, then disable each mobile wireless communications device of the given group from reporting the respective location until when said processor and memory command restarting reporting of the respective location.

10. The server of claim 9 wherein said processor is configured to when a number of mobile wireless communications devices of the given group within a set geographic area is greater than or equal to a second threshold, then configure the wireless network to provide multicast bearer services for the given group within the set geographic area.

11. The server of claim 10 wherein said processor is configured to when a call starts and the number of mobile wireless communications devices of the given group within the set geographic area is greater than or equal to a third threshold, then configure the wireless network to map a portion of a multicast bearer to the mobile wireless communications devices of the given group within the set geographic area for a broadcast mode.

12. The server of claim 10 wherein said processor is configured to when the number of mobile wireless communications devices of the given group within the set geographic area is less than a fourth threshold and when only the given group is using the multicast bearer services, then configure the wireless network to deallocate the multicast bearer services for the given group within the set geographic area.

13. The server of claim 12 wherein the second threshold is equal to the fourth threshold.

14. The server of claim 9 wherein said processor is configured to configure the wireless network to provide multicast bearer services for the given group based upon at least one of a group state of the given group, a group priority of the given group, and a group type of the given group.

15. The server of claim 9 wherein said processor is configured to configure the wireless network to provide multicast bearer services for the given group based upon macro user location information.

16. The server of claim 9 wherein the wireless network comprises a Long-Term Evolution (LTE) wireless network; and wherein the request to broadcast comprises a multicast call request.

17. A method for operating a wireless communication system comprising a plurality of mobile wireless communications devices, each configured to send a request to broadcast; a wireless network coupling the plurality of mobile wireless communications devices; and a server; the method comprising:
when a number of the plurality of mobile wireless communications devices in a given group is greater than or equal to a first threshold, then causing each mobile wireless communications device of the given group to report a respective location; and
when a number of the plurality of mobile wireless communications devices in the given group is less than the first threshold, then disabling each mobile wireless communications device of the given group from reporting the respective location until commanded to restart reporting of the respective location.

18. The method of claim 17 further comprising when a number of mobile wireless communications devices of the given group within a set geographic area is greater than or equal to a second threshold, then configuring the wireless network to provide multicast bearer services for the given group within the set geographic area.

19. The method of claim 18 further comprising when a call starts and the number of mobile wireless communications devices of the given group within the set geographic area is greater than or equal to a third threshold, then configuring the wireless network to map a portion of a multicast bearer to the mobile wireless communications devices of the given group within the set geographic area for a broadcast mode.

20. The method of claim 18 further comprising when the number of mobile wireless communications devices of the given group within the set geographic area is less than a fourth threshold and when only the given group is using the multicast bearer services, then configuring the wireless network to deallocate the multicast bearer services for the given group within the set geographic area.

21. The method of claim 20 wherein the second threshold is equal to the fourth threshold.

22. The method of claim 17 further comprising configuring the wireless network to provide multicast bearer services for the given group based upon at least one of a group state of the given group, a group priority of the given group, and a group type of the given group.

23. The method of claim 17 further comprising configuring the wireless network to provide multicast bearer services for the given group based upon macro user location information.

* * * * *